United States Patent
Hars (10) Patent No.: US 10,142,103 B2
(45) Date of Patent: Nov. 27, 2018

(54) HARDWARE ASSISTED FAST PSEUDORANDOM NUMBER GENERATION

(71) Applicant: The Boeing Company, Chicago, IL (US)

(72) Inventor: Laszlo Hars, Lafayette, CO (US)

(73) Assignee: THE BOEING COMPANY, Chicago, IL (US)

( * ) Notice: Subject to any disclaimer, the term of this patent is extended or adjusted under 35 U.S.C. 154(b) by 420 days.

(21) Appl. No.: 14/961,307

(22) Filed: Dec. 7, 2015

(65) Prior Publication Data
US 2017/0163416 A1 Jun. 8, 2017

(51) Int. Cl.
G06F 21/00 (2013.01)
H04L 9/08 (2006.01)
G06F 7/58 (2006.01)
H04L 9/06 (2006.01)

(52) U.S. Cl.
CPC ............ H04L 9/0869 (2013.01); G06F 7/582 (2013.01); H04L 9/0625 (2013.01); H04L 9/0643 (2013.01); H04L 9/0662 (2013.01); H04L 9/0668 (2013.01)

(58) Field of Classification Search
None
See application file for complete search history.

(56) References Cited

U.S. PATENT DOCUMENTS 5,909,484 A 6/1999 Kim
5,909,494 A * 6/1999 Blaze ...................... G06F 7/582
380/37
6,091,815 A 8/2000 Shimada
6,804,355 B1 * 10/2004 Graunke ............... H04L 9/0625
380/37
2002/0184273 A1 * 12/2002 Katsunori ............... G06F 7/588
708/250

(Continued)

OTHER PUBLICATIONS

Luby, M., & Rackoff, C. (1988). How to construct pseudorandom permutations from pseudorandom functions. SIAM Journal on Computing, 17(2), 373-14. http://dx.doi.org/10.1137/0217022 Retrieved from https://search.proquest.com/docview/919828131?accountid=14753.*

(Continued)

Primary Examiner — Jeffery L Williams
(74) Attorney, Agent, or Firm — MH2 TECHNOLOGY LAW GROUP LLP (57) ABSTRACT

A system and method for generating pseudorandom numbers by initializing a counter value for a call-counter, sending a bit-wise form of the counter value from the counter to a mixing function, and mixing the counter value to generate the pseudorandom number. The mixing function may be a XOR tree, substitution-permutation, or double-mix Feistel. The pseudorandom number generator can operate by mixing the bits of the call-counter, repeatedly mixing its own output, or a combination thereof. The counter is incremented by a predetermined value. In order to provide backward secrecy, the pseudorandom number is processed by a one-way function or is hashed with a cryptographic hash function, and the result thereof is used as an input value for a subsequent cycle of the mixing function. Also, several mixing functions can be operated in parallel with their output XORed.

20 Claims, 6 Drawing Sheets

MIXING FUNCTION USING A DOUBLE-MIX FEISTEL NETWORKS BASED KEY GENERATOR (56) References Cited

U.S. PATENT DOCUMENTS

| | | | |
|---|---|---|---|
| 2003/0059045 A1 | 3/2003 | Ruehle | |
| 2008/0243977 A1* | 10/2008 | Watanabe | G06F 7/582 708/250 |
| 2009/0292751 A1 | 11/2009 | Schneider | |
| 2015/0288524 A1* | 10/2015 | Jaffe | H04L 9/004 713/176 |

OTHER PUBLICATIONS

C. Adams, "The SHADE cipher: an efficient hash-function-based Feistel network," Electrical and Computer Engineering, 1997. Engineering Innovation: Voyage of Discovery. IEEE 1997 Canadian Conference on, St. Johns, Nfld., 1997, pp. 338-342 vol. 1.; doi: 10.1109/CCECE.1997.614858.*
U.S. Appl. No. 14/472,978, filed Aug. 29, 2014 to Hars.
U.S. Appl. No. 14/473,006, filed Aug. 29, 2014 to Hars.
U.S. Appl. No. 14/473,042, filed Aug. 29, 2014 to Hars.
U.S. Appl. No. 14/497,933, filed Sep. 26, 2014 to Hars.
Barker et al., "Recommendation for Random Number Generation Using Deterministic Random Bit Generators," NIST SP 800-90A Rev. 1, Jun. 2015, 110 pages.
Barker et al., "Recommendation for the Entropy Sources Used for Random Bit Generation," NIST SP 800-90B, Aug. 2012, 78 pages.
Barker et al., "Recommendation for Random Bit Generator (RBG) Constructions," NIST SP 800-90C, Aug. 2012, 50 pages.
Hars et al., "Pseudorandom Recursions: Small and Fast Pseudorandom Number Generators for Embedded Applications," EURASIP Journal on Embedded Systems, vol. 2007, Article ID 98417, 2007, 13 pages.
Hars et al., "Pseudorandom recursions II," EURASIP Journal on Embedded Systems 2012, 2012:1, 11 pages.
James, "A Review of Pseudorandom Number Generators," Computer Physics Communications 60, 1990, North-Holland, pp. 329-344.
Marsaglia, "A Current View of Random Number Generators," Computer Science and Statistics: The Interface, ed. by L. Billard, (Elsevier Science Publishers B.V. (North-Holland), 1985, 10 pages.
Search Report and Written Opinion from corresponding Singaporean Application No. 10201607934 dated Apr. 4, 2017, 6 pages.

* cited by examiner

HARDWARE ASSISTED FAST PSEUDORANDOM NUMBER GENERATION

TECHNOLOGICAL FIELD

The present disclosure relates generally to data encryption and, in particular, to an improved system and method for generating pseudorandom numbers that can be used as encryption keys, as tweak values for tweakable ciphers, as nonces for diversification of encryption and message authentication codes, and for masking information to prevent leakage in side channels.

BACKGROUND

The aviation industry largely depends on the reliable functioning of critical information technology (IT) infrastructure. Like many other industries, the aviation industry is challenged with providing adequate security for such IT infrastructure and mitigating the effects of any cyber events. Examples of cyber events include malicious or suspicious events that compromise, or attempt to compromise, the operation of an aircraft's network, including its data connections, data transmission, and computing systems.

Many scientific, engineering and IT security applications need a lot of random-looking numbers, which cannot be distinguished from true random by standard statistical tests. Generally, if the numbers are generated by an algorithm, which is performed in software on a microprocessor or in specialized electronic hardware, they are referred to as pseudorandom numbers. Pseudorandom numbers are useful in applications such as simulating physical systems, whitening structured data, and randomized computing for solving numerical mathematical problems. In IT security applications, pseudorandom numbers are used in protocols, such as nonces (numbers used once), initial values (IV), data hiding, and cryptographic key derivation.

Traditionally, pseudorandom numbers have been generated on microprocessors, which take several clock cycles for each byte to be generated. The fastest practical algorithms generate 8 bytes (64 bits) in 4 . . . 12 clock cycles on 64 bit processors. In some applications, this generation time for pseudorandom numbers is too long, such as when large quantities of pseudorandom numbers are needed in short periods of time. In some instances, electronic hardware can be custom designed to speed up the algorithms. However, such prior art pseudorandom number generators that incorporate the use of a microprocessor produce low quality (correlated, biased) numbers, are slow, tie up the microprocessor with the task, clog memory buses, and consume a lot of power/energy (resulting in increased heat dissipation and battery drain).

An additional drawback of prior art pseudorandom number generators is that they are unprotected from side channel attacks, which creates significant risks in IT security applications. During operation of electronic devices that are processing data, some information about secret keys or sensitive data always leaks in side channels (physical sources of unintended information dissemination), including data dependent variation of response times, fluctuation of power use, or ultrasonic or electromagnetic wave radiation. This is why the secrecy and integrity of stored or transmitted data can generally be assured by cryptographic means when no adversary has physical access to the electronic devices.

Thus, it is desirable to have an improved pseudorandom number generator that generates many pseudorandom numbers in one clock cycle and enables improvements in security by reducing side channel leakage without significantly increasing processing time, system complexity, the size of electronic circuits, or energy usage.

BRIEF SUMMARY

In view of the foregoing background, example implementations of the present disclosure provide a system and method for generating pseudorandom numbers including the steps of initializing a counter value for a call-counter, sending a bit-wise form of the counter value from the call-counter to a mixing function, and mixing the bit-wise form of the counter value to generate a pseudorandom number. The counter value is incremented by a predetermined value and the generated pseudorandom number can be used as an input value for a subsequent cycle of the mixing function. The system and method for generating pseudorandom numbers may also include the steps of filling an input register by repeating the counter value in its entirety as many times as possible without exceeding capacity of the input register, and filling any remaining, unfilled bits of the input register with individual bits of the counter value. Encrypted data may be stored in the memory of a storage device based on the generated pseudorandom number.

In implementations of the present disclosure, the mixing step is performed by a mixing function. The mixing function maps a first segment of the bit-wise form of the counter value input with a first segment of the bit-wise form of the counter value output by concatenating the segments. The mixing function is invertible and non-linear, and may be an exclusive-OR (XOR) tree mixing unit, substitution-permutation mixing unit, or double-mix Feistel mixing unit. The mixing function may be performed by at least two functions operating in parallel and the outputs from the at least two mixing functions are XORed. The pseudorandom number may also be processed by a one-way function or hashing with a cryptographic hash function, such that the result of the one-way processing or hashing is used as an input value for a subsequent cycle of the mixing function.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

According to example implementations of the present disclosure, an improved system for generating pseudorandom numbers for each clock cycle is provided by using a mixing function that obfuscates its input in a complex and nonlinear way.

A pseudorandom number generator (PRNG) has to be initialized with a seed. The seed is a physical random number, or a user supplied value, which makes the subsequently generated sequence unique. After initializing the PRNG with the seed, a number of requests (calls) can be issued. Each of a large number of calls returns a pseudorandom number that is different from the previous one. After a certain number of requests (calls), the returned pseudorandom numbers start to repeat. If repetitions (at low probability) are acceptable or desirable to mimic the behavior of true random numbers, the generated pseudorandom numbers may be truncated. If repetition is not acceptable, measures are taken to ensure that the period length is large enough for the intended application. Periodicity can be prevented by re-seeding the PRNG with newly acquired physical random numbers before the period restarts.

As noted above, the improved PRNGs according to example implementations of the present disclosure utilize mixing functions. Such mixing functions operate with a dependency on a large amount of secret key material, which can be hard coded, burnt into fuses, or stored in volatile memory, such as in flip-flops. The secret key material can be hard coded for all devices in a family of devices, may be set up at the initialization of a particular device, or generated at reset or at an explicit request to re-seed the PRNG.

Mixing functions are similar to ciphers but they are much faster. Mixing functions are also less secure than ciphers because some correlation may exist between their input and output, thereby making them generally unfit for encryption operations by themselves. However, when either the input or the output of a mixing function is hidden from an attacker, the attacker cannot mount traditional cryptologic attacks or side-channel attacks. Thus, the fast mixing functions are ideal for cryptographic key generation, in which application secret keys produce other secret keys, and generating pseudorandom number sequences, especially when such numbers are used internally and are hidden from an eavesdropper.

The mixing functions suitable for use in the improved PRNGs have the following properties:
1) They map n-bit input to n-bit output (n=block size).
2) The mixing depends on a large amount of secret key material, which can be generated from a single short key or by a true random number generator.
3) The mixing function is bijection (invertible).
4) Every input bit influences every output bit in non-linear way.
5) Most nonempty sets of input bits (which are independently chosen from the key material) also influence all the output bits (no effect cancels).

Figure 2:
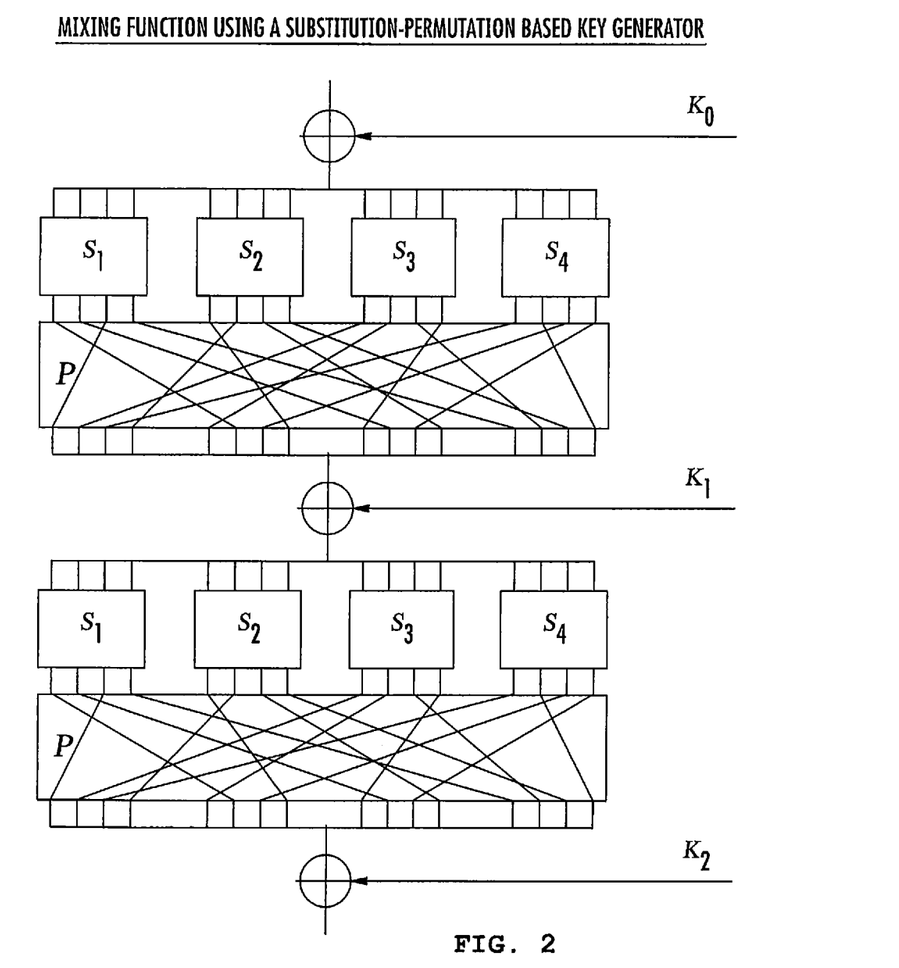
FIG. 2 is a logic diagram of a substitution-permutation network based key generator for a mixing function in accordance with an example implementation of the present disclosure.
Figure 3:
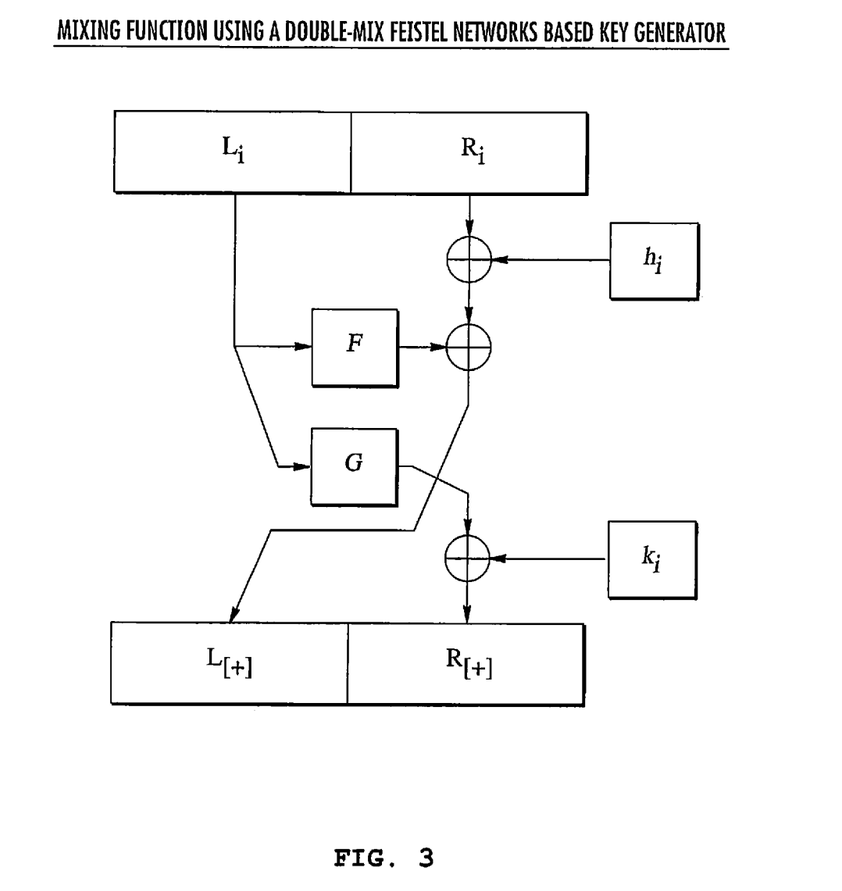
FIG. 3 is a logic diagram of a double-mix Feistel network based key generator for a mixing function in accordance with an example implementation of the present disclosure.

According to example implementations of the present disclosure, suitable mixing functions for use in PRNGs are XOR trees (FIG. 1), substitution-permutation networks (FIG. 2), and double-mix Feistel networks (FIG. 3). The non-linearity of the mixing functions, as referenced above, may be provided by arithmetic additions of shifted data or S-Boxes, which can degenerate to (N)AND/OR gates (2×1 bit S-Boxes).

Figure 1:
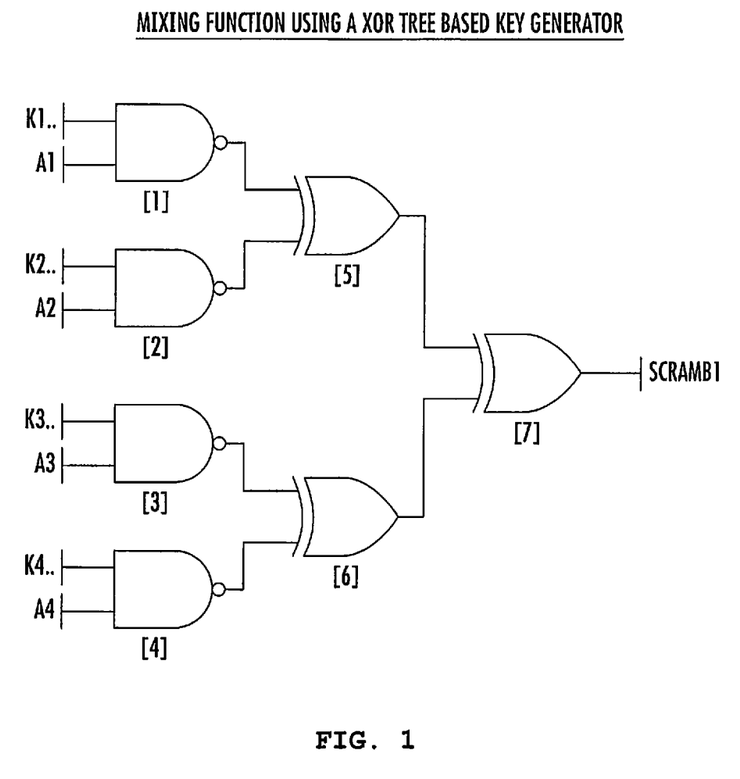
FIG. 1 is a logic diagram of an XOR tree based key generator for a mixing function in accordance with an example implementation of the present disclosure.

Referring now to FIG. 1 regarding the mixing function being a XOR tree based key generator, the input bits A1, A2, A3, A4 . . . select corresponding subkeys K1, K2, K3, K4 . . . to XOR. The final scramble operation step makes the construction non-linear and can be comprised of rotate-add operations, or a series of nonlinear S-Box operations. The XOR tree based key generator may further include a second set of subkeys, with additional input selects. The subkeys may be generated from a few base subkeys, by bit manipulating operations including rotation, addition, or XOR.

Referring now to FIG. 2 regarding the mixing function being a substitution-permutation network based key generator, the input bits are fed in from the top of the logic diagram, and the output is taken from the bottom of the logic diagram. The subkeys $K_i$ may be independent randomly created secrets, or derived from a few base subkeys. $S_1, S_2$ . . . are S-Boxes, which are small, non-linear substitution invertible functions. The number of layers of the mixing network may be chosen to be at least twice of the full mixing depth (when every input bit effects every output bit), but may be less, such that the total delay of the circuit still does not exceed a clock cycle.

Referring now to FIG. 3 regarding the mixing function being a double-mix Feistel network based key generator, F is a non-linear, very difficult (or impossible) to invert function, whereas G is invertible. Several layers of identical circuits are cascaded. In implementations with parallel operating electronic circuits, the mixing performance of a single layer of the double-mix Feistel network is double that of a single layer of a traditional Feistel network.$[L_0, R_0]$ is the input of the mixing function and the output is taken from the bottom of the last repeated layer of the logic diagram. The number of layers of the mixing network is chosen to be as high as its total delay fits into a single clock-cycle.

The mixing functions described above can be used in several modes of operation for pseudorandom number generation, examples of which are described below.

Figure 4:
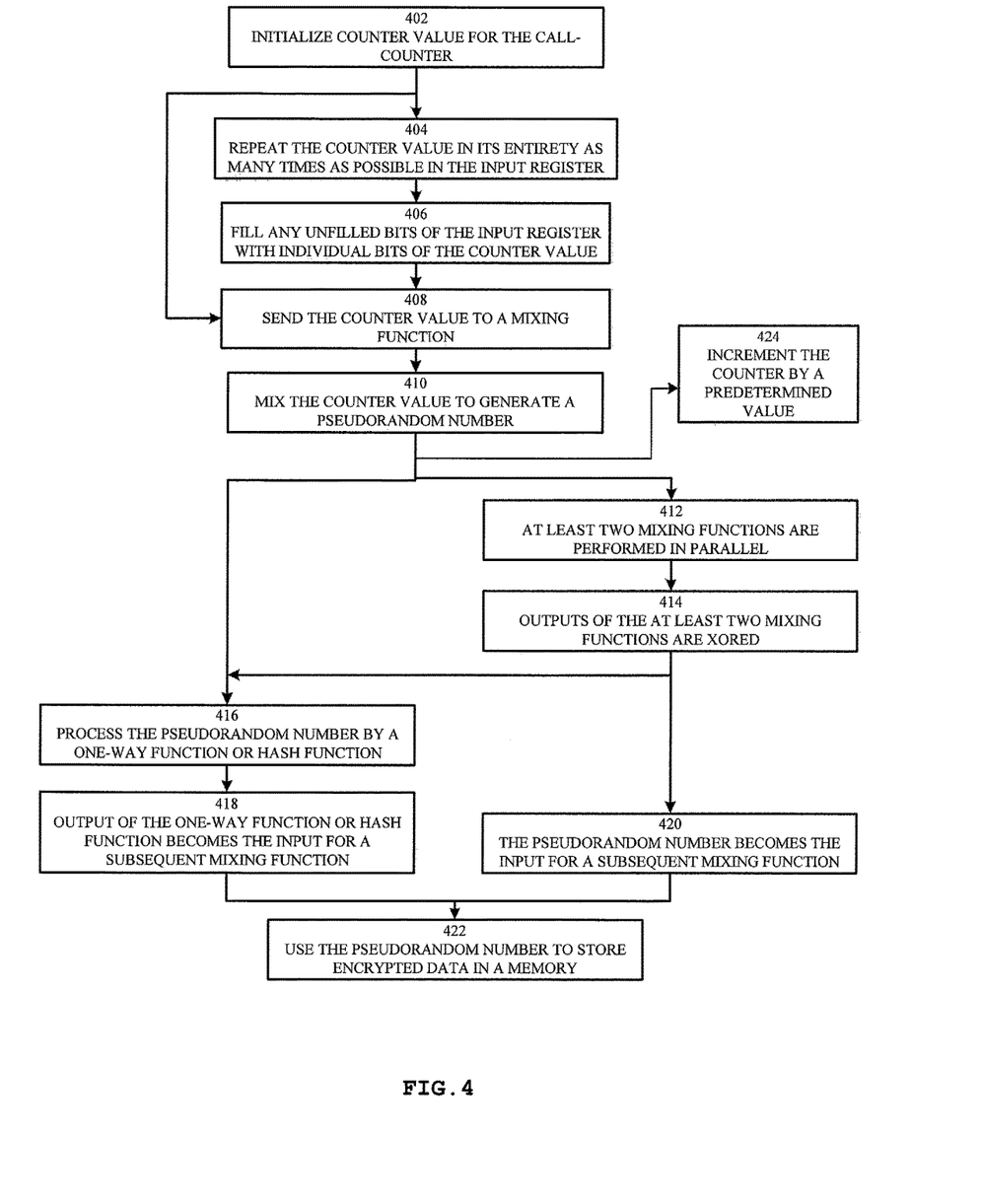
FIG. 4 is a block diagram of pseudorandom number generation methodology in accordance with an example implementation of the present disclosure.

As illustrated in FIG. 4, in a counter mode, a counter is initialized to a (short) seed (block 402) and a bit wise form of the counter value is sent to the mixing function (block 408). The mixing is performed in accordance with one of the mixing functions described above with respect to FIGS. 1-3 to generate a pseudorandom number (block 410). The counter is incremented by a predetermined value every time a pseudorandom number is requested (block 424), and the counter lets its value wrap around at overflow to continue counting from 0. The counter is reset at re-seeding of the PRNG. The counter can be a 32 bit unsigned integer, for example, which allows the generation of 4 billion unique pseudorandom numbers before repetition because different input values yield different output values of the mixing function. If needed, a longer counter can be employed and the rest of the input bits can be set to 0, or to any other constant bit pattern (which may be derived from the seed). Also, shorter counters, such as 20 bits, can be utilized, in which case after a million calls ($2^{20}$) the PRNG is re-seeded with a true random value.

In a scrambled counter mode, a counter (call-counter), as described above, is utilized but the input bits are initialized to values that are non-constant (block 402). For example, a 31 bit counter may be employed with its value repeated in its entirety as many times as it fits to the input register (block 404). In the case of 256 bit wide input register, the 31 bit counter value can be repeated in its entirety 8 times because 256/31=8 (with a remainder of 8). The remainder of 8 corresponds with 8 individual bits (least significant bits) of the counter value and those bits are deemed to be the least significant bits that are used once more to fill the remaining input register bits (block 406). In the scrambled counter mode, when the bit-wise form of the counter value is sent to the mixing function (block 408), such as a substitution-permutation mixing function (FIG. 2) for mixing the counter value (block 410), a counter width that is not the multiple of the input size of the S-Boxes is preferable because the counter bits will be distributed in different input positions of different S-Boxes. The period of the generated numbers is the same as the number of different values the counter can attain. This scrambled counter mode employs a call-counter of any desired length (so long as it is not larger than the input size of the mixing function), and request a re-seed before the generated numbers start to show periodicity.

In a recursive mode, the first input of the mixing function is a (long) seed. Subsequent inputs are the previous output of the mixing function. In this example implementation, a counter is not needed but the length of the period in the sequence of the generated pseudorandom numbers is unknown. In most cases, the period is much longer than needed by any application (at least $2^{128}$ calls at 256 bit input size). Consecutive input values of the mixing functions are less correlated than they are at counter modes, which makes the mixing more thorough.

In a hybrid counter mode, a call-counter is initialized (block 402) to the least significant bits of the (long) seed, or any fixed set of bits. The counter is incremented (block 424) at each call of the pseudorandom number generator, with wrapping around to 0 at overflow. The first input (block 408) of the mixing function (block 410) is the seed. Subsequent inputs are the previous output of the mixing function (block 420), except they are modified by changing the designated bits of the input to the counter value. This ensures that the length of the period in the sequence of the generated pseudorandom number is at least as long as at the counter modes, and most of the time much longer. As with the recursive mode, consecutive input values of the mixing functions look uncorrelated, except the short sequence of the counter bits, which are copied over. This makes the mixing very thorough, with guaranteed minimum period length. This hybrid counter mode can employ a call-counter counter of any desired length (not longer than the input size), and can request a re-seed before the generated numbers may start to show periodicity.

In all cases when applicable, the call counter may be incremented by a large, odd constant value (predetermined or generated from the seed) (block 424). This makes consecutive counter values less correlated than at an increment of 1. The generated pseudorandom number may be used to facilitate storage of encrypted data in a memory (block 422), such as encryption keys, tweak values, nonces, and initial values.

The PRNGs incorporating mixing functions as described herein make some information about their internal state (counter and the output of the mixing function) public, except for the key material. The security rests on the protection of this key material. If an adversary discovers this key material, the adversary can reverse the mixing function calls, and find out previously generated random numbers and also the numbers, which will be generated in the future. In a further implementation of the present disclosure, a version of a PRNG with backward secrecy is provided, wherein the output of the PRNG is processed by a one-way function or hashed with a cryptographic hash function (block 416), and the result is returned (block 418) instead of the unprocessed output of the mixing function. A number of mixing functions working in parallel (block 412), and their output XORed together (block 414), can also serve as a superfast one-way function. This construction is one-way (hard to invert), because the output of individual mixing functions cannot be reconstructed from their XORed value, which is the overall output. This construction is still orders of magnitude faster than any prior art solutions because, in two clock cycles, thousands of pseudorandom bits can be generated. Another alternative implementation of the present invention with backward secrecy is achieved by replacing the mixing functions with several different ones working in parallel and their output XORed. This aggregate mixing function cannot be easily reversed even with the knowledge of the key material, and the running time is only half of the above described hash-construction, that is, typically one clock cycle.

There are several advantages to use of PRNGs incorporating mixing functions as described above, including: very fast operation for generating, e.g. 32 bytes (256 bits) in a single clock cycle in typical computing devices; production of hundreds or thousands of random bits at once; highly parallel processing, which masks side channel leakage; generation of high quality pseudorandom numbers by employing nonlinear bit mixing; easy re-seeding by simply feeding in true random bits as the key material and as the initial counter value, where applicable; use of a large amount of secret key material that is easily personalized and easy to diversify or reset upon request, which makes it easy to ensure that no two deployments are the same; and supported use with fixed input and fixed key material to produce predictable bit sequences (advantageous for test purposes). Additionally, the PRNGs of the present disclosure free up the processor for other tasks and reduce energy consumption as compared to prior art PRNGs. Example applications for the PRNGs of the present disclosure include cryptographic functions in in-flight computers, military and space programs, corporate networks, personal and laptop computers, smart mobile devices, and secure communication networks. Non-security related applications benefit also from fast and high quality pseudorandom numbers, such as simulating physical systems and performing randomized computing or Monte-Carlo computations.

According to example implementations of the present disclosure, the various components of the improved PRNG of the present disclosure may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the PRNG and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the PRNG of the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the PRNG. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 5:
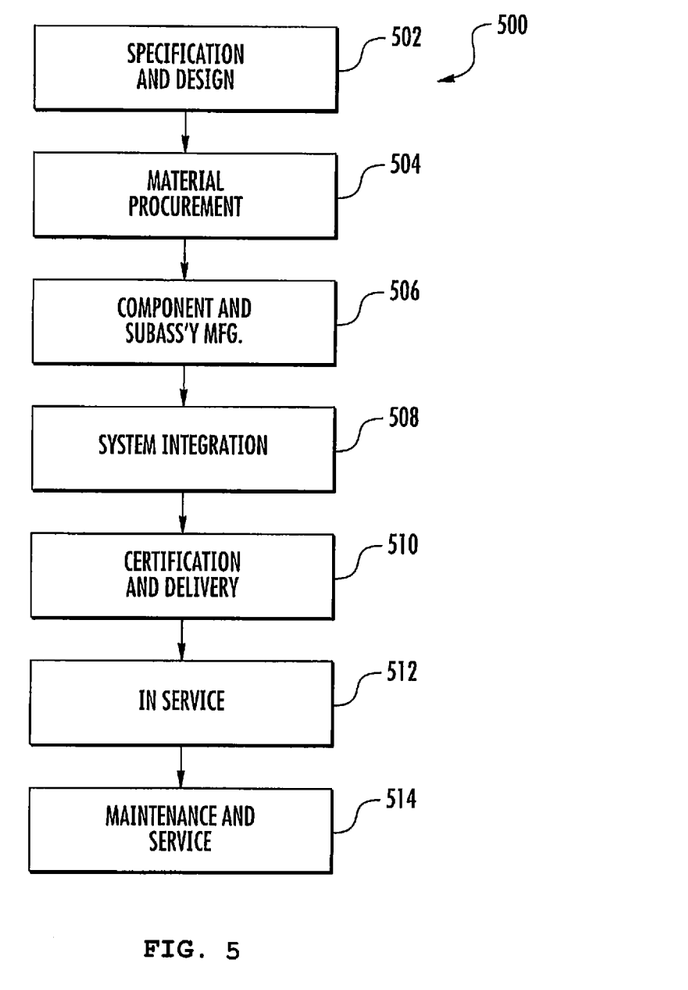
FIG. 5 is a block diagram of aircraft production and service methodology.
Figure 6:
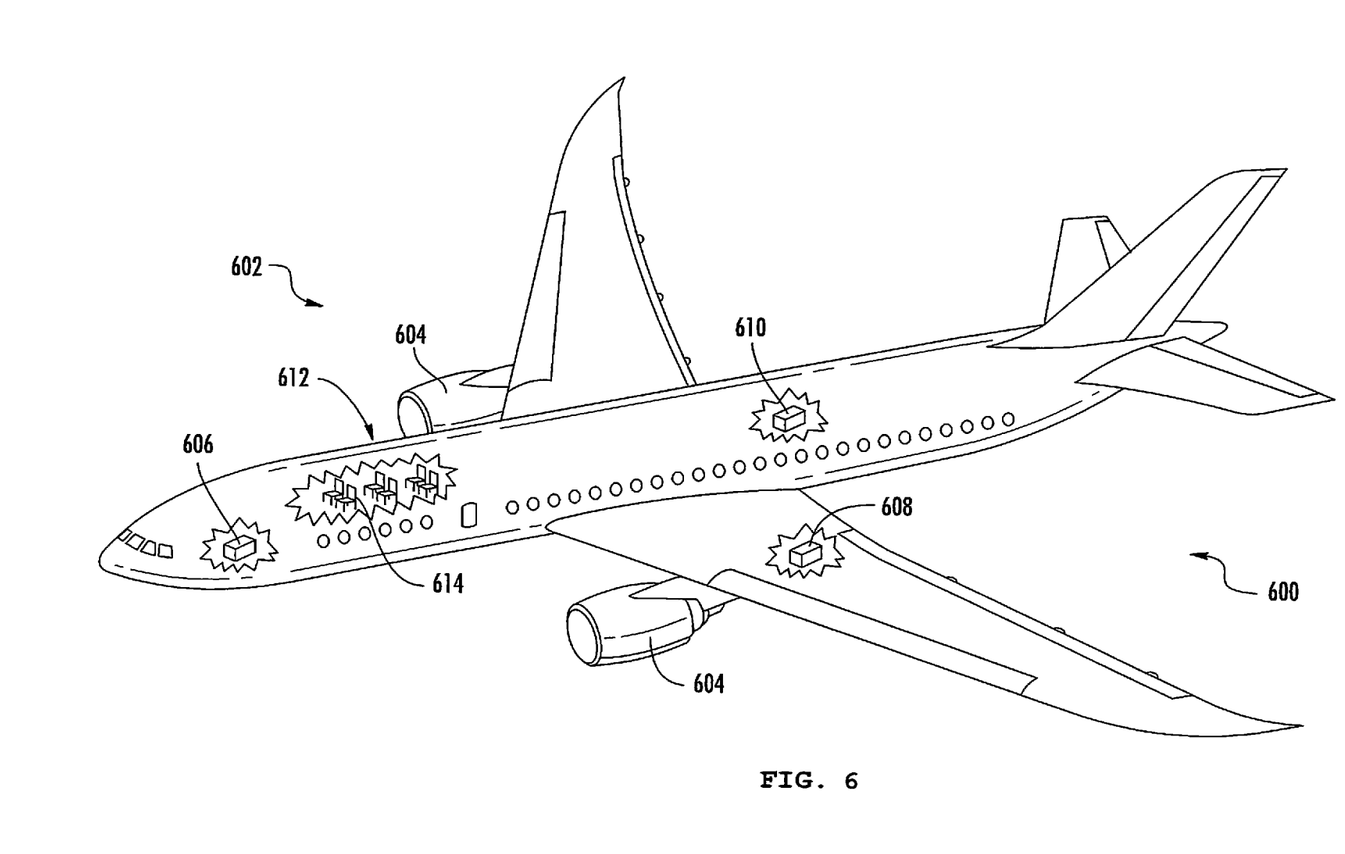
FIG. 6 is a schematic illustration of an aircraft.

As referenced above, examples of the present disclosure may be described in the context of aircraft manufacturing and service. As shown in FIGS. 5 and 6, during preproduction, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 514).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating pseudorandom numbers comprising the steps of:
    initializing a counter value for a counter (block 402);
    sending a bit-wise form of the counter value from the counter to a mixing function (block 408);
    mixing the bit-wise form of the counter value to generate a pseudorandom number (block 410);
    filling an input register by repeating the counter value in its entirety as many times as possible without exceeding capacity of the input register (block 404); and
    filling any remaining, unfilled bits of the input register with individual bits of the counter value until the input register is full (block 406).

2. The method of claim 1 further comprising the step of incrementing the counter value by a predetermined value (block 424).

3. The method of claim 1 further comprising the step of using the pseudorandom number as an input value for a subsequent cycle of the mixing step (block 410).

4. The method of claim 1 wherein the mixing step (block 410) maps a first segment of the bit-wise form of the counter value input with a first segment of the bit-wise form of the counter value output by concatenating the segments.

5. The method of claim 4 wherein the mixing step (block 410) is invertible.

6. The method of claim 4 wherein the mixing step (block 410) is non-linear.

7. The method of claim 4 wherein the mixing step (block 410) comprises a function selected from the group consisting of an exclusive-OR "XOR" tree mixing function, a substitution-permutation mixing function, and a double-mix Feistel mixing function.

8. The method of claim 1 wherein the mixing step (block 410) further comprises steps of mixing the counter value at least twice in parallel mixing functions (block 412) and exclusive-XORing ("XORing") outputs from the parallel mixing functions (block 414).

9. The method of claim 1 further comprising the steps of:
    processing the pseudorandom number by a one-way function or hashing the pseudorandom number with a cryptographic hash function (block 416); and
    using a result of the one-way processing of the pseudorandom number or hashing of the pseudorandom number as an input value for a subsequent cycle of the mixing function (block 418).

10. The method of claim 1 further comprising the step of using the pseudorandom number to store encrypted data in a memory (block 422).

11. A system for generating pseudorandom numbers comprising:
    a counter that is initialized with a counter value (block 402);
    a mixing function that mixes a bit-wise form of the counter value to generate a pseudorandom number (block 410);

an input register arranged to be filled by repeating the counter value in its entirety as many times as possible without exceeding capacity of the input register (block 404) and by filling any unfilled bits of the input register with individual bits of the counter value until the input register is full (block 406).

12. The system of claim 11 wherein the counter value is incremented by a predetermined value (block 424).

13. The system of claim 11 wherein the pseudorandom number serves as an input value for a subsequent cycle of the mixing function (block 420).

14. The system of claim 11 further comprising a storage device having a memory that stores encrypted data based on the pseudorandom number (block 422), the encrypted data being selected from the group consisting of encryption keys, tweak values, nonces, and initial values.

15. The system of claim 11 wherein the mixing function (block 410) maps a first segment of the bit-wise form of the counter value input with a first segment of the bit-wise form of the counter value output by concatenating the segments.

16. The system of claim 11 wherein the mixing function (block 410) is invertible.

17. The system of claim 11 wherein the mixing function (block 410) is non-linear.

18. The system of claim 11 wherein the mixing function (block 410) is selected from the group consisting of a XOR tree mixing function, substitution-permutation mixing function, and double-mix Feistel mixing function.

19. The system of claim 11 wherein the mixing function (block 410) is performed by at least two mixing functions operating in parallel (block 412) and the outputs from the at least two mixing functions are XORed (block 414).

20. The system of claim 11 wherein:
the pseudorandom number is processed by a one-way function or hashed with a cryptographic hash function (block 416); and
a result of the one-way processing of the pseudorandom number or hashing of the pseudorandom number is used as an input value for a subsequent cycle of the mixing function (block 418).

\* \* \* \* \*